May 4, 1954

H. J. MILLER 2,677,553

VEHICLE DOOR OPERATED FOOT SCRAPER

Filed Oct. 13, 1952

Harold J. Miller
INVENTOR.

BY *Clarence A. O'Brien
and Harvey B. Jacobson*
Attorneys

May 4, 1954     H. J. MILLER     2,677,553
VEHICLE DOOR OPERATED FOOT SCRAPER
Filed Oct. 13, 1952     2 Sheets-Sheet 2
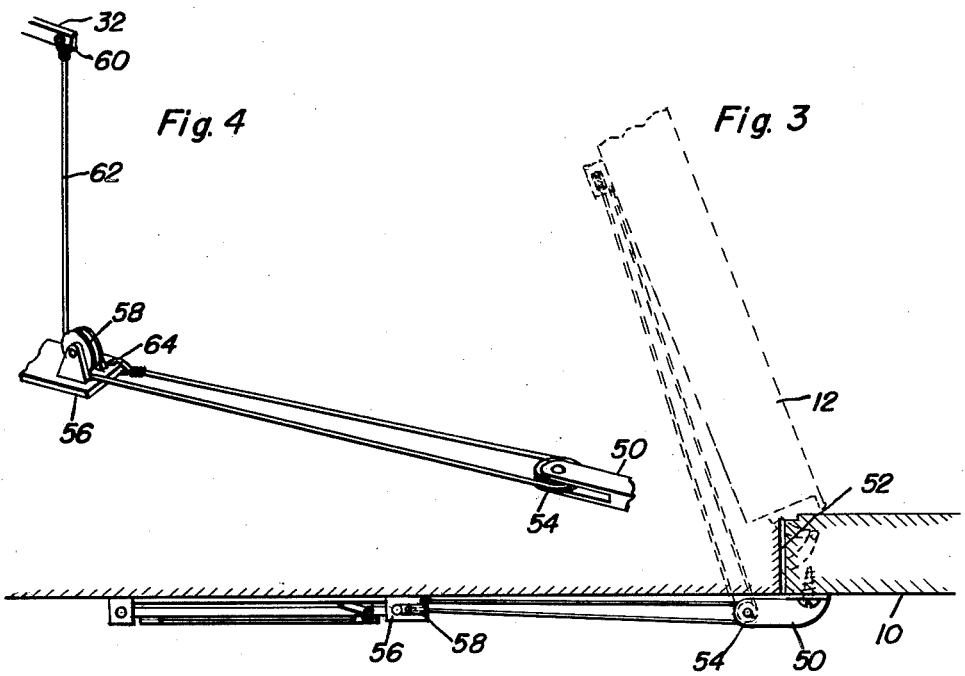
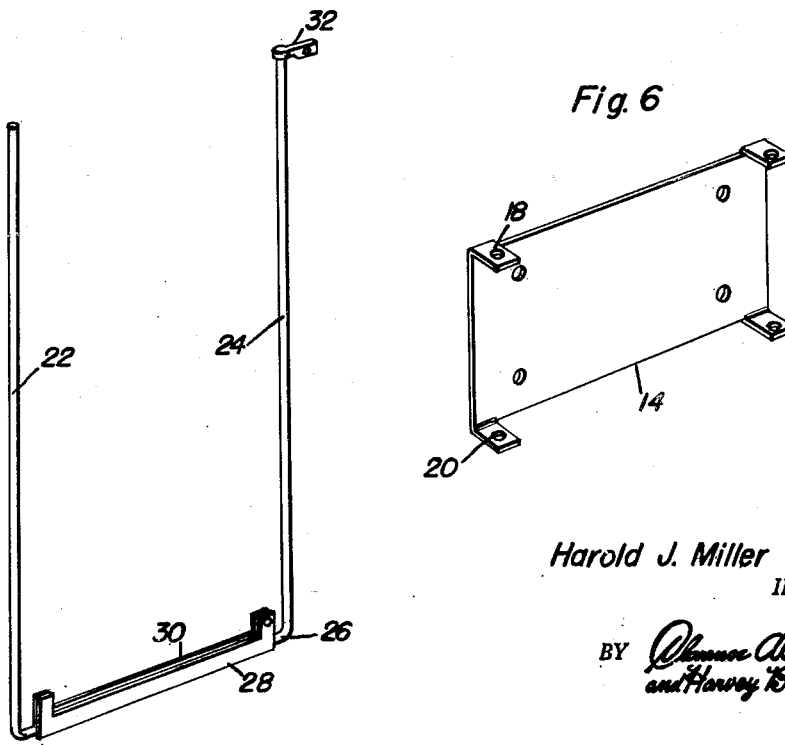
Harold J. Miller
INVENTOR.

Patented May 4, 1954

2,677,553

UNITED STATES PATENT OFFICE 2,677,553

VEHICLE DOOR OPERATED FOOT SCRAPER

Harold J. Miller, Dearborn, Mich.

Application October 13, 1952, Serial No. 314,493

2 Claims. (Cl. 280—164)

This invention relates to a scraper and particularly to a scraper for attachment to a vehicle to be lowered into position for removing mud from the feet of passengers.

In the entering and leaving of vehicles it is frequently necessary for the passenger to walk through muddy streets or in muddy places or otherwise have the shoes soiled so that when entering the car the soil will be carried into the vehicle and cause soiling therein. The present invention relates to a foot scraper for attachment to an automotive vehicle so that the foot scraper may be lowered into utilizing position so that mud and other soil may be removed from the shoes or foot coverings of the passenger before entering the vehicle.

It is accordingly an object of the invention to provide an improved foot scraper.

It is a further object of the invention to provide a foot scraper which may be readily applied to a vehicle.

It is a further object of the invention to provide a foot scraper which may be so mounted on a vehicle that opening the door thereof will lower the scraper into operative position.

It is a further object of the invention to provide a foot scraper which will automatically retrieve itself after being used.

Other objects and many of the attendant advantages of the present invention will be apparent from the following detailed description taken in conjunction with the accompanying drawing, in which:

Figure 3 is a plan view of the scraper showing the operating linkage;

Figure 4 is a perspective view of the operating linkage;

Figure 5 is a perspective view of the scraper frame and blade;

Figure 6 is a perspective view of the mounting bracket;

Figure 1:
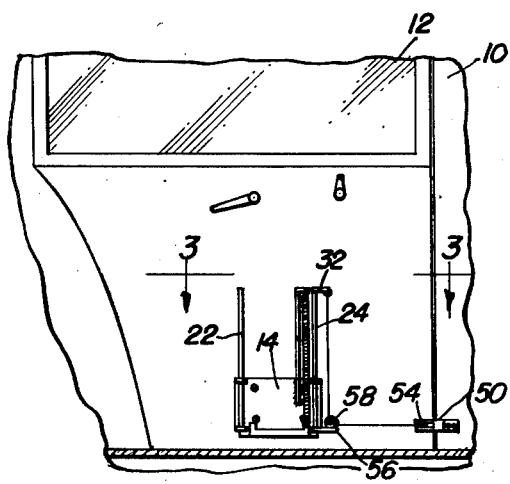
Figure 1 is an elevation of the scraper shown in retracted position as mounted on the door of an automobile.
Figure 2:
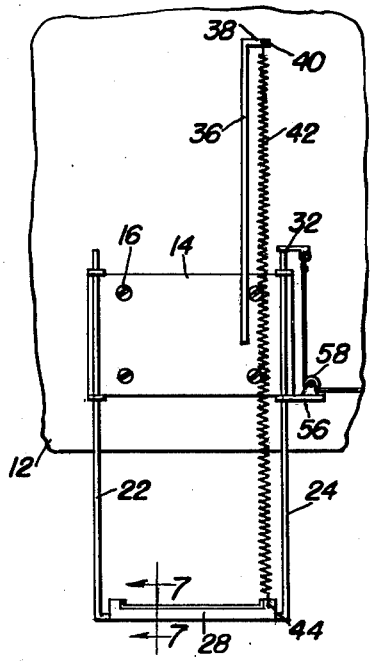
Figure 2 is an enlarged elevation of the scraper in extended position.
Figure 8:
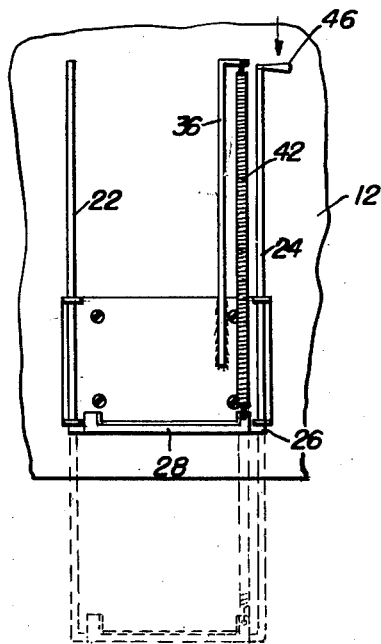
Figure 8 is a modification according to the invention.
Figure 7:
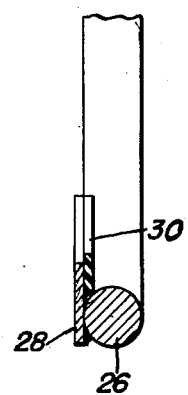
Figure 7 is a cross-section through the scraper blade taken substantially on the plane indicated by the line 7—7 of Figure 2.

In the embodiment according to the invention a vehicle 10 is provided with a door 12 which swings outwardly to open.

The scraper proper comprises a mounting plate 14 which may be attached to the door 12 by any suitable means, such as screws 16. The plate 14 is provided with ears 18 which are preferably integral with the plate 14 and are bent outwardly so that they extend outwardly from the plane of the plate 14. The ears 18 are provided with apertures 20 which are in alignment with each other. That is the aperture in the lower ear 18 is in alignment with the aperture in the opposed upper ear 18. So that the apertures 20 at each end of the plate 14 are in alignment with each other. A U-shaped frame has legs 22 and 24 which are adapted to pass through the apertures 20 in the aligned ears 18 so that the frame legs 22 and 24 may slide upwardly and downwardly in the ears 18. The frame is provided with a substantially straight bight portion 26 on which is mounted a scraper blade 28 and attached to the scraper blade 28 is a wiper 30 constructed of rubber or other pliable material.

The legs 22 and 24 are disposed through the openings 20 and ears 18 and a handle or arm 32 is rigidly mounted at the top of one of the legs such as the leg 24. An upstanding arm 36 is rigidly mounted on the plate 14 and extends upwardly in proximity to the surface of the door 12. The support 36 has an inwardly extending arm 38 having an aperture 40 in which is mounted a spring 42 connecting with an aperture 44 in the blade 28. The spring 42 is tensioned so that it normally lifts the frame including the legs 22 and 24 upwardly so that the frame is retrieved against the face of the door 12.

The frame may be manually lowered by means of a handle 46 which may be manually engaged to depress the frame against the tension of the spring 42.

An automatic lowering device will comprise a linkage connecting the frame to leg 24 with a portion of the vehicle 10. For this purpose an anchor member 50 is rigidly mounted on the body 10 adjacent to the frame opening 52 and has a sheave 54 mounted at the free end thereof. A bracket 56 is mounted on the lower ear 18 adjacent to the frame 10 and has mounted thereon a sheave 58. A handle or arm 52 is provided with an aperture 60 and one end of a flexible link member 62 such as a flexible cable is rigidly connected in the aperture 60. The bracket 56 is likewise provided with an aperture 64 and the other end of the flexible member 62 is rigidly connected to the bracket 56 by means of the aperture 64. The flexible member 62 is then entrained over the sheaves 54 and 58 so that opening the door will tension the member 62 and because of the linking of the links between the sheaves 54 and 58 the linkage 62 will be shortened drawing the framework legs 22 and 24 downwardly and tensioning the spring 42.

Because of the lengthening of the links between the sheaves 54 and 58 the linkage 62 will depress the arm 32 thereby pulling down the leg members 22 and 24 so that the scraper blade 28 and the wiper 30 will be positioned below the edge of the door 12 so that the foot of the operator may be readily engaged with the blade 28 and the wiper 30.

It will be apparent that with the attachment secured on the door the opening of the door with the linkage 62 connected will lower the wiper device so that the occupant of the motor vehicle may use the scraper blade 28 or the wiper 30 to remove soil from his shoes or other foot covering. Likewise, with the cable 62 detached the scraper may be lowered by application of the hand to the handle 46 or to the arm 32 so that the blade may be readily lowered to operating position. As soon as the device has been used the handle 46 may be liberated so that the spring 42 will retrieve the scraper and return it to a safe position on the face of the door. When the cable 62 is utilized the closing of the door will relieve the tension on the cable 62 so that the spring 42 will retrieve the scraper and house it on the inside of the door where it will be out of the way and convenient for use when needed.

While preferred embodiments of the invention have been shown and described according to the best present understanding thereof, it will be apparent that changes in construction and arrangement of the parts may be resorted to without departure from the true spirit of the invention.

Having described the invention, what is claimed as new is:

1. A scraper for mounting on a motor vehicle comprising a substantially rectangular plate, said plate being adapted for attachment to the inner side of a vehicle door outwardly projecting ears at each corner of said plate, the upper and lower ears at each end of the plate being in alignment, said ears having apertures therein, a U-shaped frame, the legs of said U-shaped frame being slidably received in said apertures, a scraper blade mounted on the bight of said U-shaped frame, a rigid arm mounted on said plate, a spring extending between said arm and said frame, said spring yieldingly urging said frame to a retracted position, and operating means responsive to opening of the vehicle door for moving said frame to extended position.

2. A scraper for mounting on a motor vehicle comprising a substantially rectangular plate, outwardly projecting ears at each corner of said plate, the upper and lower ears at each end of the plate being in alignment, said ears having apertures therein, a U-shaped frame, the legs of said U-shaped frame being slidably received in said apertures, a scraper blade mounted on the bight of said U-shaped frame, a rigid arm mounted on said plate, a spring extending between said arm and said frame, said spring yieldingly urging said frame to a retracted position, said plate being adapted for attachment on the inner side of a vehicle door, a sheave mounted adjacent the lower corner of said plate, a sheave mountable on the body of said vehicle, an actuating cable connected to the top of said frame and to the lower corner of said plate, said actuating cable being entrained over said sheaves.

References Cited in the file of this patent
UNITED STATES PATENTS

| Number | Name | Date |
| --- | --- | --- |
| 796,895 | Childers | Aug. 8, 1905 |
| 1,154,228 | Bauman | Sept. 21, 1915 |
| 1,227,218 | Terry | May 22, 1917 |
| 1,718,428 | McNulty | June 25, 1949 |